(12) United States Patent
Patterson

(10) Patent No.: US 6,389,541 B1
(45) Date of Patent: *May 14, 2002

(54) REGULATING ACCESS TO DIGITAL CONTENT

(75) Inventor: Patrick E. Patterson, Arlington, VA (US)

(73) Assignee: First Union National Bank, Atlanta, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,545

(22) Filed: May 15, 1998

(51) Int. Cl.[7] ............................................... H04K 1/00
(52) U.S. Cl. ..................... 713/201; 713/185; 713/200; 705/53; 705/56; 705/57; 705/58; 705/59
(58) Field of Search ........................... 705/56, 57, 58, 705/59, 53; 713/185, 201

(56) References Cited

U.S. PATENT DOCUMENTS

| | | | |
|---|---|---|---|
| 4,471,163 A | 9/1984 | Donald et al. | |
| 4,528,643 A | 7/1985 | Freeny, Jr. | 364/900 |
| 4,558,176 A | 12/1985 | Arnold et al. | |
| 4,658,093 A | 4/1987 | Hellman | |
| 4,683,553 A | 7/1987 | Mollier | |
| 4,796,220 A * | 1/1989 | Wolfe | 364/900 |
| 4,999,806 A | 3/1991 | Chernow et al. | |
| 5,023,907 A * | 6/1991 | Johnson et al. | 380/4 |
| 5,033,084 A | 7/1991 | Beecher | |
| 5,191,611 A | 3/1993 | Lang | |
| 5,319,705 A * | 6/1994 | Halter et al. | 380/4 |
| 5,337,357 A * | 8/1994 | Chou et al. | 380/4 |
| 5,615,264 A | 3/1997 | Kazmierczak et al. | |
| 5,671,276 A | 9/1997 | Eyer et al. | |
| 5,671,279 A | 9/1997 | Elgamal | |
| 5,703,951 A * | 12/1997 | Dolphin | 380/25 |

(List continued on next page.)

OTHER PUBLICATIONS

InterTrust Technology "MetaTrust Overview"; http:www.intertrust.com/technology/tech.html (8 pages).

(List continued on next page.)

*Primary Examiner*—Albert Decady
*Assistant Examiner*—Paul E. Callahan
(74) *Attorney, Agent, or Firm*—Troutman Sanders LLP

(57) ABSTRACT

Digital content such as text, video, and music are stored as part of a compressed and encrypted data file, or object, at a client computer, such as a personal home computer. The content is inaccessible to a user until a payment or use authorization occurs. Payment or use authorization occurs via a real-time, transparent authorization process whereby the user enters account or use data at the client computer, the account or use data is transmitted to a payment server computer, the account or use data is preprocessed at the payment server computer and if payment information is required and is present, the payment information is transmitted to a payment authorization center. The payment authorization center approves or rejects the payment transaction, and bills the corresponding account. The authorization center then transmits an authorization signal to the payment server computer indicating whether the transaction was approved and if not, which information was deficient. In response, the payment server computer transmits a token to the client computer, and if the token indicates approval, an installation process is initiated at the client computer whereby the object is activated and locked to the particular client computer. The object can be reopened and reused at any time on that particular computer. If the object is transmitted or copied to a different computer, the required payment or use information must again be tendered for access to the content.

56 Claims, 13 Drawing Sheets

U.S. PATENT DOCUMENTS

| | | | |
|---|---|---|---|
| 5,708,709 A | | 1/1998 | Rose |
| 5,708,780 A | | 1/1998 | Levergood et al. |
| 5,715,314 A | | 2/1998 | Payne et al. |
| 5,724,424 A | | 3/1998 | Gifford |
| 5,778,173 A | | 7/1998 | Apte |
| 5,784,460 A | | 7/1998 | Blumenthal et al. |
| 5,790,664 A | * | 8/1998 | Coley et al. ............... 380/4 |
| 5,794,207 A | | 8/1998 | Walker et al. |
| 5,796,952 A | | 8/1998 | Davis et al. ........... 395/200.54 |

OTHER PUBLICATIONS

InterTrust Technologies Corporation: Overview: InterTrust Powers The New Digital Economy, A Piece of the Tick—Version 2.0, Oct. 9, 1998 (38 pages).

Sibert et al., DigiBox: A Self–Protecting Container for Information Commerce, Proceedings of the First USENIX Workshop on Electronic Commerce, New York, New York, Jul. 1995 (14 pages).

Netdox Brochure, "Certified Verified Anytime" (12 pages).

Netdox Brochure 1997—Doxit Service Overview (5 pages).

Tumbleweed Software, "POSTA"; http://www.posta.com/posta/posta_overview.htm, (3 pages).

Vbox White Paper, http://www.previewsystems.com/products/vbox/whitepaper/white_paper.html, (13 pages).

Overview of Release Software's Services (3 pages).

Setting Up a Web Store: A White Paper for Software Resellers; 1997 Release Software Corp.; pp. 1–17 http://www.releasesoftware.com/whitep/resellerwhitepaper.rtf.

Setting Up a Web Store: A White Paper for Software Developers and Publishers; 1997 Release Software Corp.; pp. 1–18; http://www.releasesoftware.com/whitep/isvwhitepaper.rtf.

* cited by examiner

PRIOR ART

PRIOR ART

PRIOR ART

REGULATING ACCESS TO DIGITAL CONTENT

BACKGROUND

This invention relates to regulating access to an object containing digital information or content stored at a client computer.

Content traditionally has been packaged in physical form, and physically delivered from one point to another. For example, the stories and images contained in most morning newspapers are arranged in electronic form, on computers, but the newspapers are published in printed form and delivered to the subscribers' doorsteps by newspaper carriers. Business documents that need to be delivered to an associate or customer often are placed in an envelope and delivered by an overnight express service to their destination.

Computer networks, including public switched networks using Transmission Control Protocol/Internet Protocol (TCP/IP) such as the Internet, represent a potentially economical and efficient conduit for the electronic delivery of content. Digital files including text, graphics, sound, video, or any number of media formats can be created, and stored electronically, and delivered from one point to another via a network.

Applications for transfer of content via computer networks have proliferated in recent years, in part due to the popularity of the Internet. For example, one widely used application is electronic mail ("email"), a messaging protocol for the delivery of text-based messages from one user to another. An email message also can include attachments, which are files that the sending party selected and designated for delivery along with the email message.

Another application, the Internet browser, provides a mechanism for viewing World Wide Web ("Web") pages. Web pages are multimedia files written in a hypertext format, for example, utilizing the hypertext mark-up language (HTML), and stored at servers computers ("Web servers") on the Internet. A Web server responds to a request from a client to view a Web page by downloading the appropriate file to the client. The file is displayed by the client's browser, and usually is stored in the client's cache directory and/or memory along with other recently accessed Web page files. Each time a user at the client computer wishes to view a new Web page, the user must enter the address, or Uniform Resource Locator (URL) of the file corresponding to the Web page, or select a hypertext link corresponding to the URL of that page. The client then requests from the Web server the file at the designated URL, and the server delivers this file to the client.

Because content often is produced originally in digital form, a potential has arisen for the producers of such content to sell directly to their customers, without the need for physical production or a distribution chain, or third-party sales intermediaries such as retailers. For example, authors or publishers may offer their books for sale in digital form on the Internet, for immediate download by customers, without incurring the cost of printing and distributing the book in paper form. Likewise, newspaper publishers could deliver their daily content electronically, to the user's home computer desktop, instead of in paper form to their doorstep, and music producers could sell their recordings online without producing and distributing tapes or compact disks. Electronic distribution could result in cost savings to the consumer and increased profitability to the content producer, due to the reduction in printing and distribution costs.

In an electronic delivery or distribution scheme, a baseline requirement is that content producers or sellers must have a way to regulate access to their product, for example, by first receiving payment before making the content accessible. Furthermore, since digital files are extremely easy to copy and distribute, sellers and producers have an interest in locking or encrypting the files containing the content, so as to limit access to those who have paid for it.

The efficacy and desirability of delivering and receiving content via a computer network such as the Internet is determined by several additional factors. For example, the speed and capacity of the server and client computers, and the communication link therebetween, may significantly affect content delivery and sometimes prohibit, as a practical matter, delivery of certain media formats. The speed of file transfer is affected by, among other things, the bandwidth of the communications link between the server and the client, the traffic on the network at the time of file transfer, and the size of the file(s) to be transferred. While small, plain text files normally can be delivered quickly using existing systems and networks, other file types, such as multimedia files containing graphics or sound, can be quite large and therefore may take significantly longer time to deliver. This is particularly true of delivery to home computers, which usually have a relatively low-bandwidth connection (e.g. a modem and standard telephone line) to the network. Also, memory capacities, including Dynamic Random Access Memory (DRAM) and disk space, can limit the size and complexity of files that can be executed and stored by a client or server computer.

Factors associated with maintaining a network connection also may affect the desirability of electronic content delivery, particularly from the standpoint of the client. For example, most Web sites consist of multiple pages including hypertext links to related pages at the same server, and to other Web sites located at other servers. When browsing, or jumping from page to page, on the Web, an Internet connection should be maintained continuously, because each file is accessed by a separate request from the client. Maintaining a connection can be inconvenient because it may tie up the user's telephone line, the connection may be slow (requiring the user periodically to wait for the next page to be downloaded), or the connection may terminate unexpectedly before the user has completed viewing the document. Moreover, some Internet access providers charge customers based on connection time, so maintaining a connection over a long period of time can become expensive.

Yet another factor associated with electronic content delivery is the level of privacy protection afforded the sending and receiving parties. For example, electronic documents undergoing transmission may contain confidential business information, thus users may be reluctant to deliver such documents over a computer network for fear that the document may be intercepted by a third party, either intentionally or unintentionally. A message sent via a packet-switching network such as the Internet passes through many different computers on the network, or nodes, on the way to its final destination. The message potentially could be intercepted at any one of these nodes, or at the final destination.

Also important for content delivery are the attractiveness and ease of use of interfaces presented to the user for interacting with the computer or other content-providing vehicle. In the physical world, interfaces are important for a variety of purposes. A newspaper, for example, is arranged to have an aesthetically pleasing layout, eye-catching graphics and titles, and easy browsing from one page to the next, in order to facilitate viewing its content. Also, an interface can govern the manners in which separate physical documents are arranged and delivered. When sending physical documents, for example, related documents often are grouped by paperclip or staple, or by packaging in an envelope. Like the physical world, in the digital environment, using a network for sending a document, receiving a document, viewing a document, paying for a document, or requesting permission to access a document all may be controlled through user interfaces. The properties and characteristics of the particular interface(s) used will affect the desirability of conducting such operations electronically.

SUMMARY

Access to digital content is regulated by the mechanisms described herein, based on, for example, proper payment or other authorization information submitted by a user or computer process. Embodiments may include various combinations of the following features.

Objects embodying digital content (such as newspaper text, executable computer programs, or music) are arranged in a format for electronic delivery, the format comprising an encrypted, compressed, parsed data string which includes the files containing the content, a unique coded key corresponding to the object, an access authorization form, and a setup file. The data string also may include applications necessary for viewing the content, such as browsers or viewers. The object may be copied and transmitted freely between computers. For example, a merchant server on the Internet may advertise objects representing newspapers or magazines available for delivery to client computers. Users at client computers may download an object using, for example, File Transfer Protocol (FTP), or users request that the object be sent to the client computer via electronic mail. Delivery is facilitated by the fact that the object is compressed and therefore requires relatively less time to transmit across the network. As an alternative to network delivery, the object may be acquired from a CD-ROM or other physically transportable medium. The object can be stored at the client computer, on a hard drive, for example, or on a transportable medium.

Completion of an authorization process is required in order to unlock, or gain access to, the object. Access to the object may be requested at the direction of a human user, or may be requested without human intervention, such as during execution of a computer program or script. Once the authorization process has been completed successfully, an install process is initiated at the client computer, wherein the object's unique coded key is copied to a location at the client. The install process also causes a machine identification code corresponding to the client to be copied to a location at the client. On the Microsoft Windows Operating System, the Registry file is used for storing the unique coded key and the machine identification code. The installation process allows the object to be executed, or "published," locally, at that particular client computer, as opposed to occurring across a network, and "locks" the installed object to that particular machine. The object can be copied and is freely transmissable between computers, but the authorization process will be executed again if access is attempted at a different computer.

When access to an object is requested initially at a client computer, for example by a human user or by an automated computer script, the client computer conducts an access check. The access check may comprise searching one or more designated system files at the client computer for the unique key corresponding to the object and the machine identification code corresponding to the computer at which the request occurred. If the access check reveals that the required files are present, then the object is automatically decoded and executed. The files containing the digital content are copied to a temporary directory, and the content is available for use. When the resource using the content has completed such use, the temporary directory is deleted and the object is encrypted. The content can be reaccessed and reused at that particular computer as many times as the user or resource desires.

If the access check fails, then an external authorization procedure is implemented. Payment and/or use information is collected at the client computer at which the access request occurred. The payment/use information can be input by a human user, or can be automatically collected by the resource based on existing, stored information. Payment information may be required if the producer or supplier of the object requires such payment for execution of the object (i.e. the object is being sold or licensed to the user). Alternatively or in addition to payment information, use information may be required, such as employment-related data, educational information, family information, or any other information which a content producer or supplier wishes to consider in regulating access to the object. The payment/use information is transmitted from the client to a payment server, using a communications link such as the Internet.

The payment server directs the external authorization procedure, based on the payment/use information received. The payment server first may process, at a "preprocessing" stage, the payment/use information. During preprocessing, the payment server may search the information for payment information in correct format, such as valid credit card number (i.e. proper number of digits) and expiration date. Alternatively, if only "use" information is required for accessing the object, the payment server may search for the required "use" information. For example, a magazine may require that users indicate they are a student at an accredited U.S. law school in order to gain access to an object representing a legal magazine. The payment server will scan the information received from the client for such indication of law school, and if found, will transmit a message back to the client initiating an installation procedure as discussed later herein.

If payment information is required, and preprocessing reveals proper format, then selected portions of the payment information are transmitted via a communications link to an authorization center for account verification. The authorization center may be, for example, a credit card authorization center. In this example, the payment server transmits the credit card number, expiration date, and the amount of the purchase to the authorization center, and the authorization center verifies or rejects the transaction based on the funds available in the account and the amount of the requested purchase. If the purchase is verified, the authorization center deducts the appropriate amount from the account and sends a message to the payment server indicating verification. If the purchase is rejected, the authorization center sends a message to the payment server indicating rejection. A dedicated frame relay network may comprise the communications link between the payment server and the authorization center.

Upon receiving a message from the authorization center indicating either acceptance or rejection of the transaction, the payment server transmits a "token" back to the client computer. The token is a file indicating whether the transaction has been approved; i.e. whether the object should be installed and access granted. If the token indicates approval, the token causes the client computer to execute the install process discussed previously, wherein, for example, a unique coded key corresponding to the object is installed at the client, along with the client machine identification code. The object is then automatically published, and access is available thereafter (without requiring further payment or use information) according to the access check described herein. If the token indicates rejection, the install process will not be initiated and access is denied. The token may contain additional information indicating reasons for the rejection, and the client may display a message based on this additional information, for the benefit of a human user.

The token, as well as the access check and the install process, is transparent and inaccessible to the resource requesting access. The "resource" seeking access to the object may be a human user, a computer program, or a combination thereof. The requesting resource, to the extent feasible, is prevented from copying the token or copying the installed unique coded key so as to enable access without the required payment or other authorization at other client computers.

Although the token and the unique coded key are not meant to be copied from one computer to another, the object itself may be copied or delivered to other computers or media. If access to the object then is requested at another computer, the access check again will be implemented, and payment or use information will be required for access if not already supplied at that particular computer.

Advantages of the digital content access regulating techniques described here may include one or more of the following.

By providing mechanisms for selectively granting access to digital content, the methods and techniques described here provide a practical and efficient way for producers or other authorized suppliers of such content to deliver and/or sell directly to their customers, without the need for physical production, a distribution chain, or third-party sales intermediaries. These mechanisms authorize and complete a purchase of digital content by billing or debiting the appropriate financial account, activating or unlocking the object embodying the content that was purchased, and storing authorization information at the buyer's computer so that the content can be accessed at that particular computer on an ongoing basis once it has been purchased. While transfer of the object to a different computer is allowed, unregulated access to its content at the different computer is prevented. Thus, the mechanisms protect the economic interests of content suppliers by preventing wholesale copying and distribution of unlocked, potentially valuable digital content.

The mechanisms described here also protect the buyer's confidential payment information, occur in real-time so as to grant the buyer quick and easy access to the object as soon as he purchases it, and utilize existing financial instruments, such as credit cards, debit cards, or demand deposit accounts.

The mechanisms described here also allow a customer to enjoy the advantages of a digital product without the delays and inconveniences associated with continuously retrieving files over a limited bandwidth public switched network. The product is stored at the customer's computer in compressed and encrypted form, until the time at which the customer desires to view or use the product. Purchase or activation then occurs according to the mechanisms described here.

Once activated and unlocked, the product is executed, or published, directly on the customer's computer, and the customer can view or use the product without the need for network access. The mechanisms therefore make accessing large digital files, including multimedia documents or movies, much more convenient and enjoyable to the user Additional security can be provided by encrypting, in addition to the object itself, the files containing the content. Such additional encryption can be implemented using, for example, the Blowfish algorithm. When the object is executed (decompressed and decrypted, with the files containing the content copied to a temporary subdirectory), these files containing the content may be decrypted "on the fly" as a continuous data stream, as the product is executed. This provides protection against unauthorized copying of the decrypted files containing the content, during execution of the object.

A customer may obtain an object in any of several convenient and efficient ways, and the object may be copied and transmitted to others who also may wish to purchase or properly access the content contained therein. Electronic mail, for example, can be used to deliver the object to the customer's electronic mailbox. Allowing electronic mail to be used for delivery of packaged content to a customer provides the benefit of extending the functionality of a communications framework which is already existent and available to a wide number of potential customers. It provides the additional benefit of not requiring the user to monitor the delivery process or maintain a network connection during delivery. In fact, delivery of various digital products to the user's electronic mailbox could be automated to occur at regular intervals, thereby eliminating the hassle of a user having to request each and every day the delivery of, for example, the daily newspaper in digital form.

The systems and techniques described here also enable the coordinated execution, or "publishing," of the files comprising the object. Such coordinated execution provides benefits to the user—for example, the direct publication of a Web site completely on the customer's client computer, without requiring input or instructions from the user. The system uses common, existing applications such as browsers and viewers to execute files and publish digital content, thus reducing the need for the user to purchase or acquire additional applications for the use of digital content.

Other advantages and features will become apparent from the following description, including the drawings and claims.

DETAILED DESCRIPTION

Figure 1:
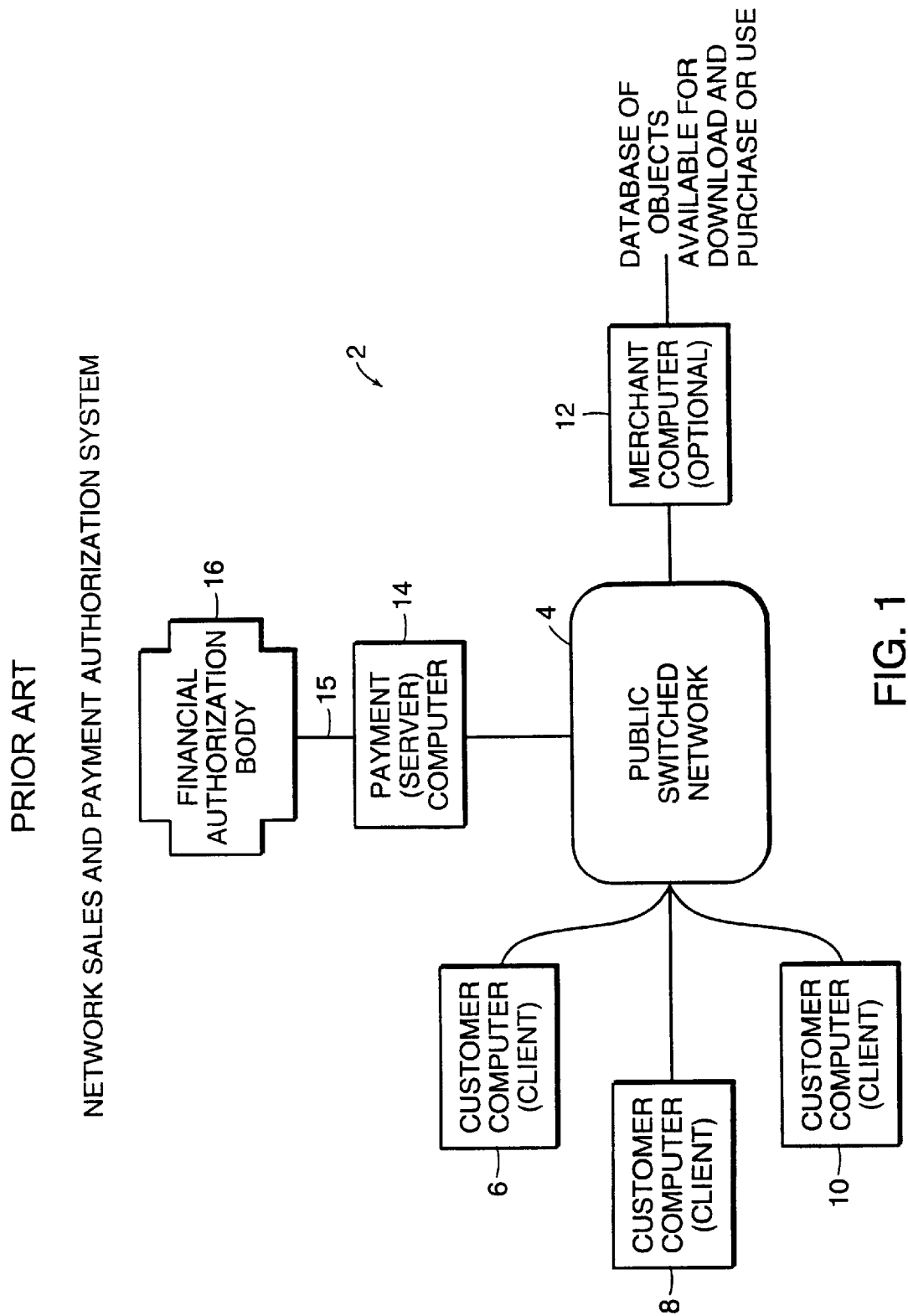
FIG. 1 is a block diagram illustrating components of a sales and payment authorization system.

FIG. 1 shows a network sales and payment authorization system 2. The system utilizes a network 4, such as the public switched network, which allows remote computers to communicate with one another. For example, the Internet and the hypertext software protocol of the World Wide Web may be used for this purpose. Hypertext Markup Language (HTML) files residing at server computers may be accessed and viewed by remote client computers with browser software, via the Internet and the Hypertext Transfer Protocol (HTTP) for requesting and receiving files. HTML files can contain or refer to any type of digital data, including multimedia documents with text, audio, video, 3-D, and animation, and can launch executable programs. An HTML file is identified by a Uniform Resource Locator (URL) pinpointing the file's location, and a client can request that the appropriate server deliver a particular file to it by specifying the correct URL.

Digital products may be displayed and available for purchase at a merchant computer 12, which is a server connected to the network 4. The digital products may be encrypted in order to protect against unauthorized access, and may be compressed to facilitate efficient delivery and storage. Customers may download the products from the merchant computer 12 to any of a plurality of client computers 6, 8, 10 which also are connected to the network 4. Customers may use a personal home computer connected to the Internet via a modem and telephone line as client computer 6. As an alternative to downloading the product, customers can request that the product be emailed to them, or can copy the product from a computer-readable physical medium such as a diskette or CD-ROM.

A payment computer or server 14 is connected to the network 4 for processing payment for and authorizing access to an object. Payment computer 14 is connected to financial authorization body 16 via a telecommunications link 15, for example, a dedicated frame relay network.

Figure 2:
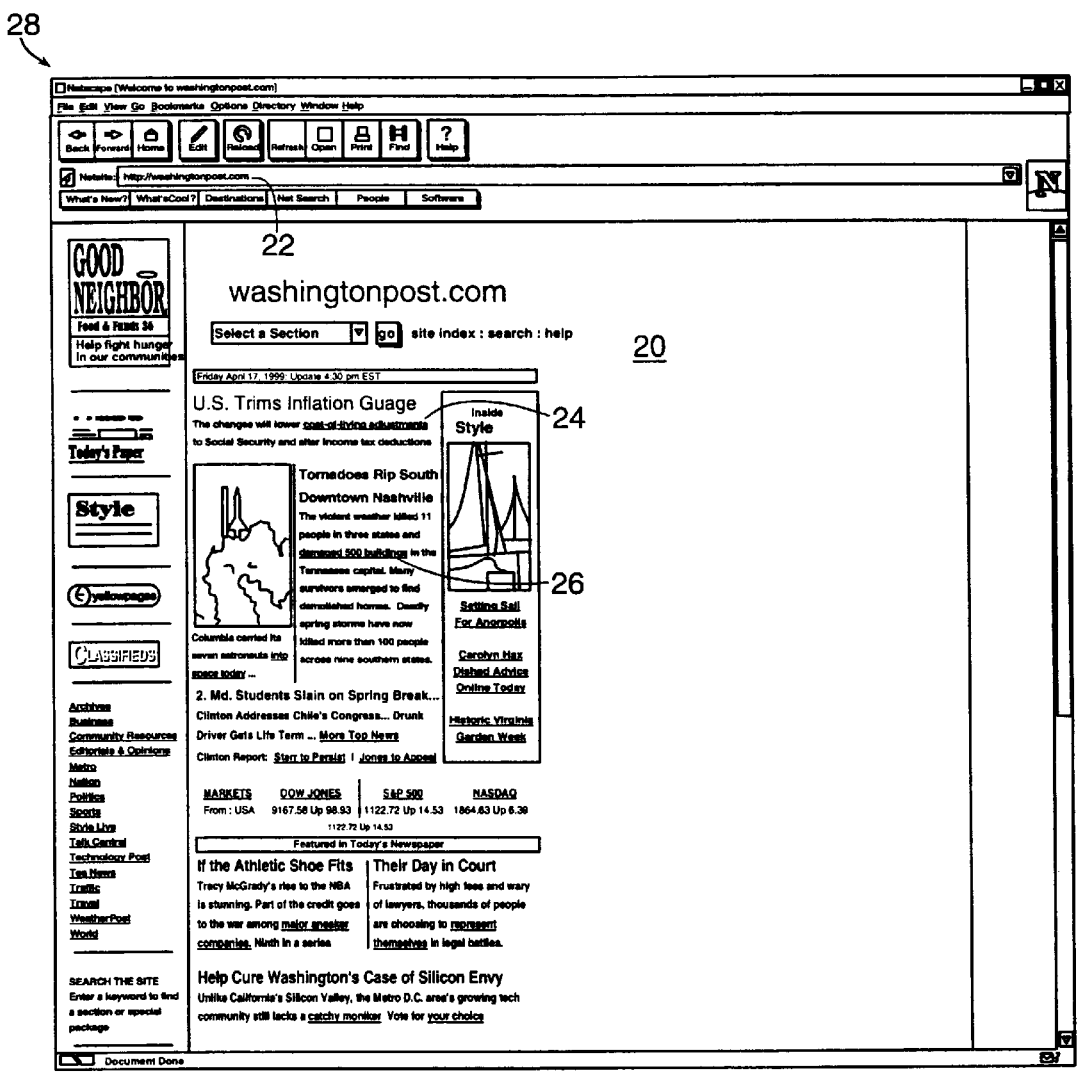
FIG. 2 is a browser display of a Web page of a popular newspaper, with content similar to the traditional printed version, available for reading online.

FIG. 2 illustrates one format for viewing digital content. FIG. 2 shows a Web page 20, comprised of HTML files, which is part of the Web site of a popular newspaper. The Web page 20 represents the "front page" of an electronic version of the newspaper. The Web page 20 is located at URL 22, and includes text and graphics, as well as hypertext links 24, 26 to internal pages of the Web site, analogous to internal pages of a traditional printed newspaper. The Web page 20 can be viewed with an Internet browser, such as the Netscape Navigator browser depicted in FIG. 2. When the user selects a hypertext link 24, 26 the browser will request from the Web site server the HTML file at the corresponding URL, and will display this file.

Figure 3:
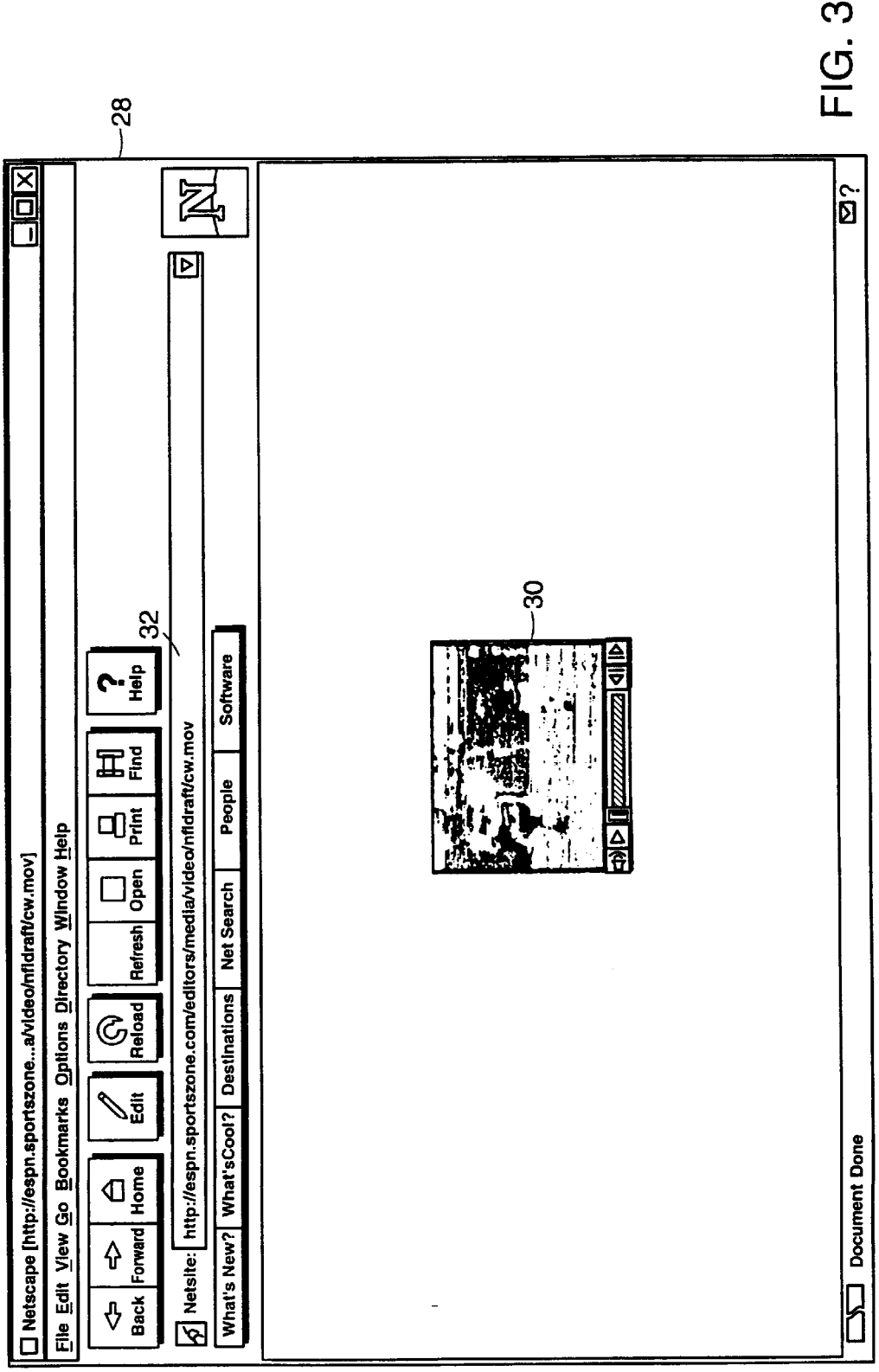
FIG. 3 is a movie displayed using the Quicktime browser plug-in application, available for viewing online.

As can be seen in FIG. 3, content available for browsing in real-time on the Web is not limited to text and graphics, but also may include movies and sound. The movie 30 shown in FIG. 3 is a file located at URL 32, which has been downloaded from the server to the client. The browser, along with any necessary helper applications or plugins, displays the movie in browser window 28 where it is now ready to play.

Multimedia files such as those depicted in FIGS. 2 and 3 may require significant time to download from the server on which they reside, due to the large size of the files and the limited bandwidth of the network over which they must be sent. Thus, browsing the Web in real-time for viewing of digital content such as newspapers and movies may not be desirable or practical for many users. An alternative method is to package the content in a compressed, encrypted, self-extracting format and deliver it to the user's computer, and after the user has paid for the object, to allow access to the content at the user's computer. FIGS. 4–12 and the corresponding description describe such packaging, delivery, payment and selected access to digital content.

Figure 4:
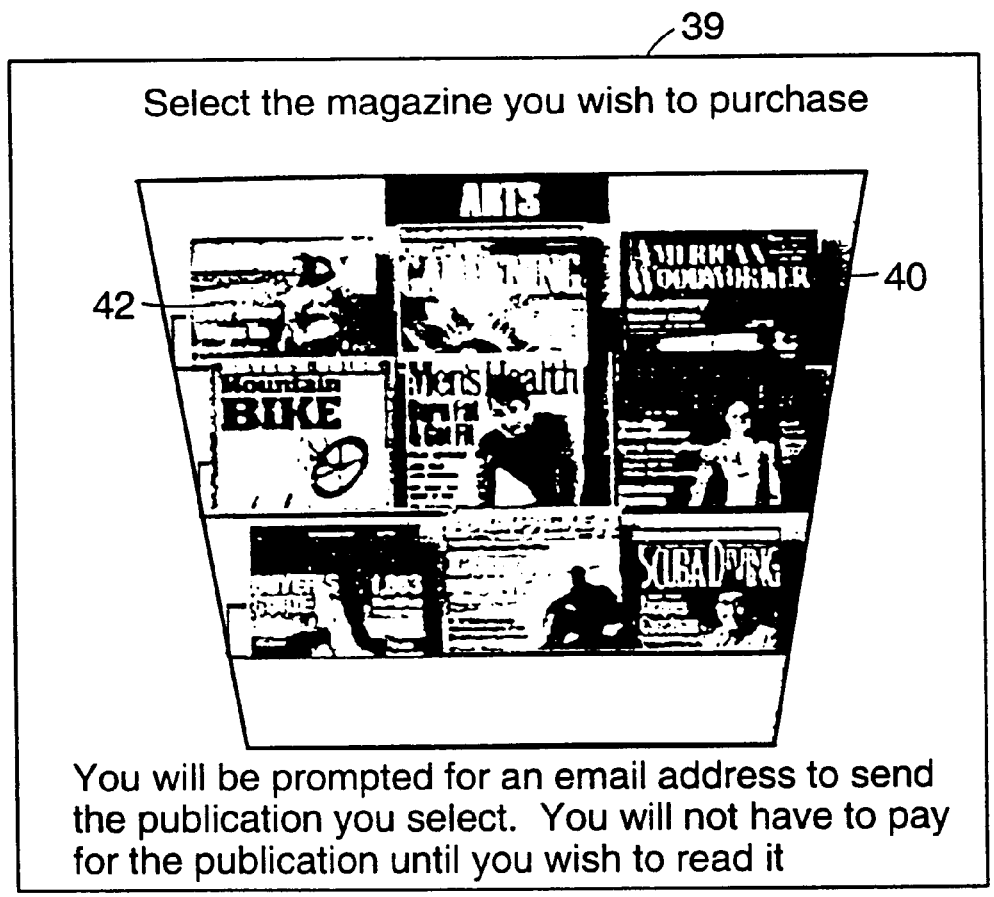
FIG. 4 is an example of an "electronic magazine rack," displaying objects which can be delivered via a network and activated and viewed.

FIG. 4 depicts an example of digital content available at an electronic magazine rack 39. Digital content is embodied in objects, which are compressed, encrypted, executable, and/or self-extracting files. Objects contain strings of digital data which when decompressed and decoded are automatically reconstituted as distinct file types understood and controlled by the computer operating system. These files are digital representations of virtually any data type supported by the operating system, including text, pictures, executable computer programs, music, movies, voice, or any other type of digital data. This digital data constitutes the information or content embodied in the object. Objects embodying such digital data or content may be referred to as media objects, and media objects which are exchanged or delivered in electronic commerce may be referred to as commerce media objects.

Objects available at magazine rack 39 include magazines 40 and 42. The user can select the object desired, and can have it delivered electronically, such as by email or using File Transfer Protocol (FTP). The user then can pay for the object at a later time, and thereafter can browse or execute the product at his leisure, in real-time at his own client computer, without the need for maintaining a network connection or for downloading files repeatedly from a remote server via the network. After the user has paid for the object and is done viewing or executing it, the object is stored at the user's client computer in encrypted, compressed form until the user again requests to view or execute the object.

Figure 5:
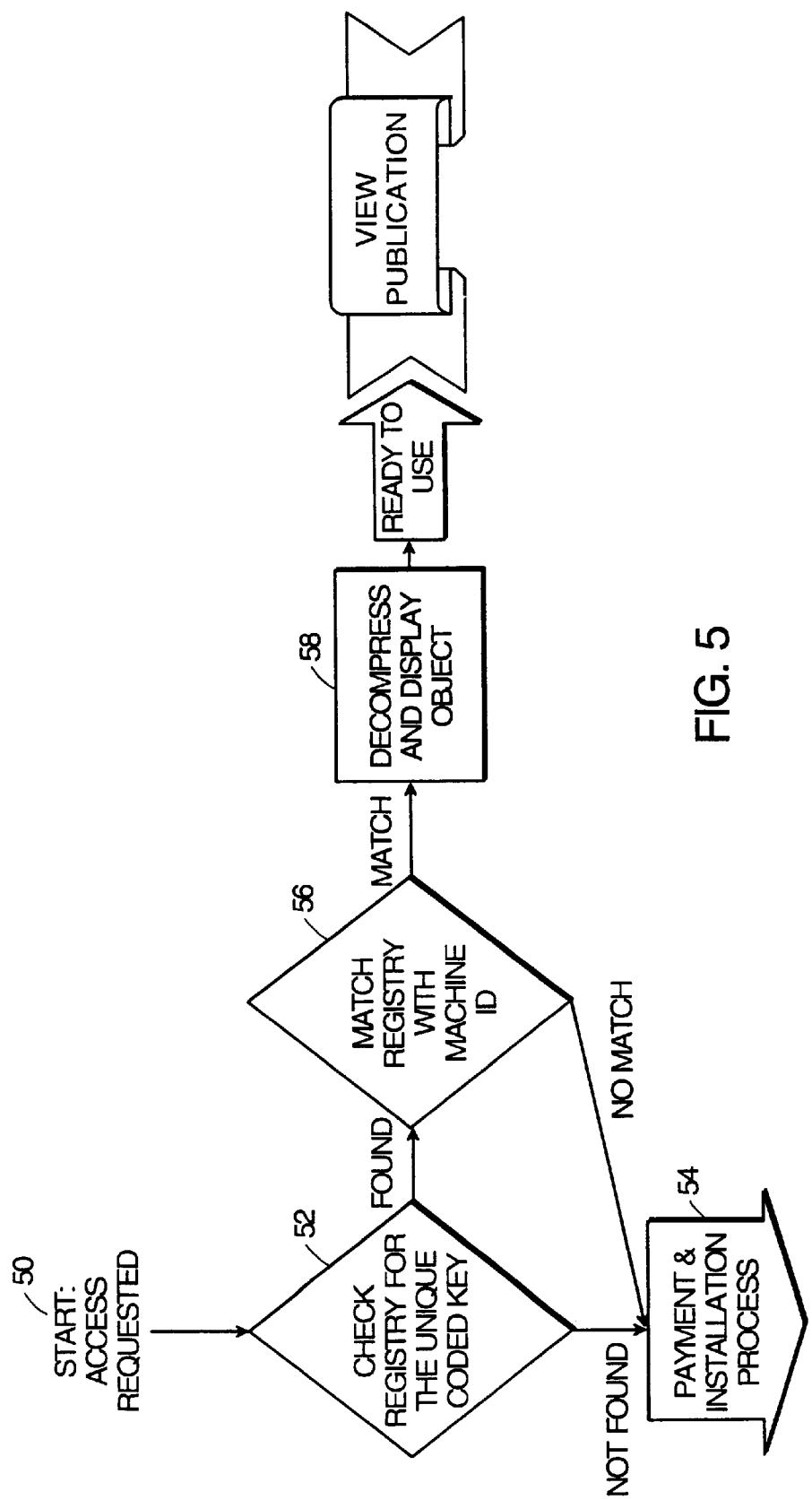
FIG. 5 is a flow chart illustrating a check coded key, or "access check," function.
Figure 6:
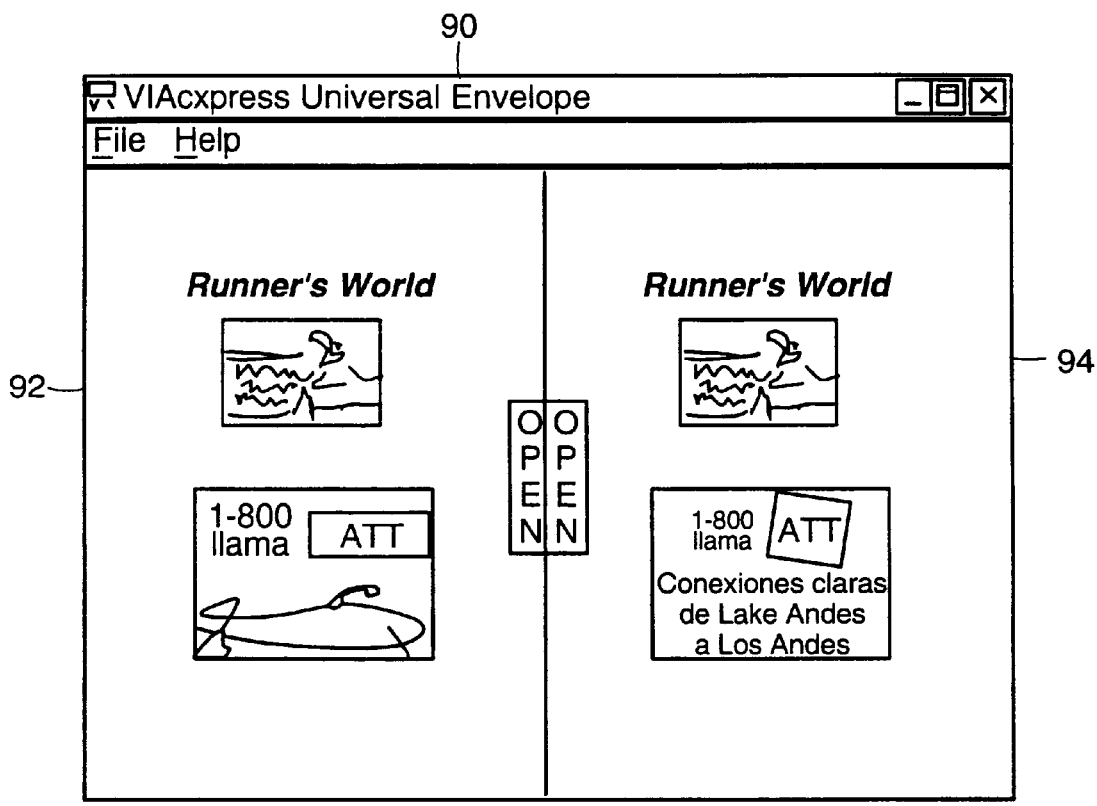
FIG. 6 is an example of the initial interface, representing an "electronic package," of an object to which access may be granted.

FIG. 5 is a flow chart illustrating a procedure initiated at a client computer when a user requests to view or execute an object. FIG. 6 shows the initial interface or packaging of object 90, in this example a digital magazine. A user indicates a request to access object 90 by clicking on doors 92 or 94, or selecting an "open" command from the file menu. This access request is shown as step 50 in FIG. 5. At step 52, the client computer on which the object is stored searches an operating system file for a unique coded key corresponding to the object 90. Every unique object has a unique coded key (which also may be referred to simply as a "key" or "cookie") which acts as a key for accessing the object. When the object is paid for and installed, the unique coded key is written to an operating system file at the computer on which it is installed. If the operating system is the Microsoft Windows Operating System, for example, this system file is the Windows Registry file. Thus, in step 50, if the object 90 already has been properly paid for and installed on the client computer using the Windows OS, the unique coded key corresponding to object 90 will be found in the Registry file. If the unique coded key is not found, the payment and installation process begins at step 54, further illustrated in FIGS. 7A and 7B. If in fact the unique coded key is found, then at step 56 the client computer attempts to match its machine ID with a machine ID recorded in the Registry. In addition to recording the unique coded key in the Registry file, a machine ID was recorded in the Registry file when an object was first paid for and installed, in order to lock the installation to a particular machine. This prevents a user from purchasing one object and sending functional copies to others. If a machine ID match is not found, then the payment and installation process is initiated at step 54. If the correct Machine ID is found, then this indicates prior payment for the object and access should be granted. In that case, the object is decompressed, decoded, and displayed or executed (or, "published") at step 58, and thus becomes ready for use or viewing by the user.

Figure 7:
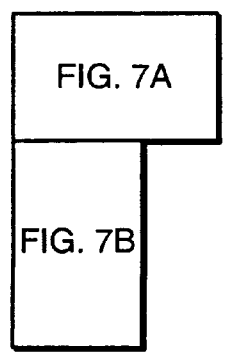
FIGS. 7A and 7B depict a flow chart of a payment and installation process.
Figure 7A:
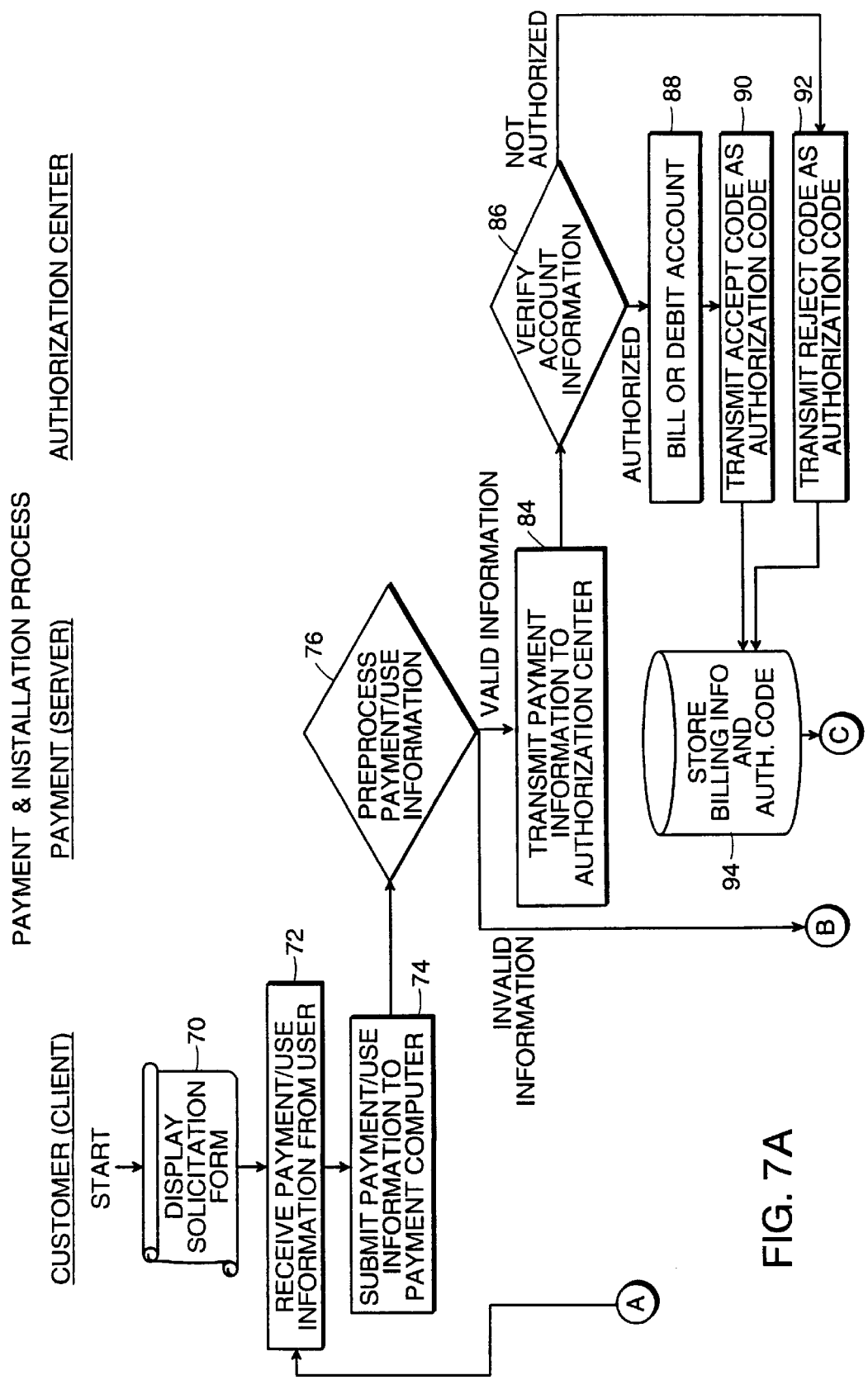
Figure 7B:
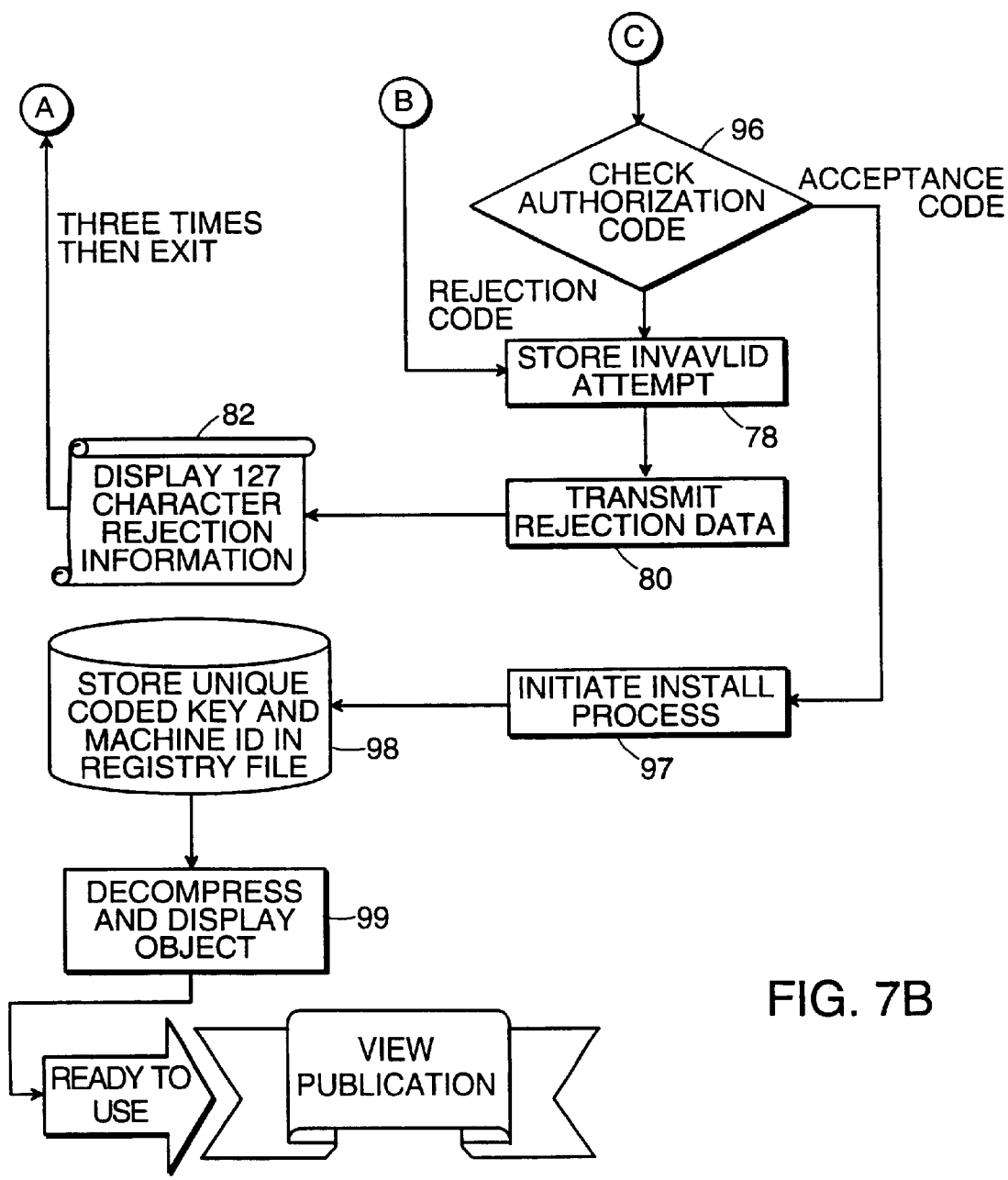
Figure 8:
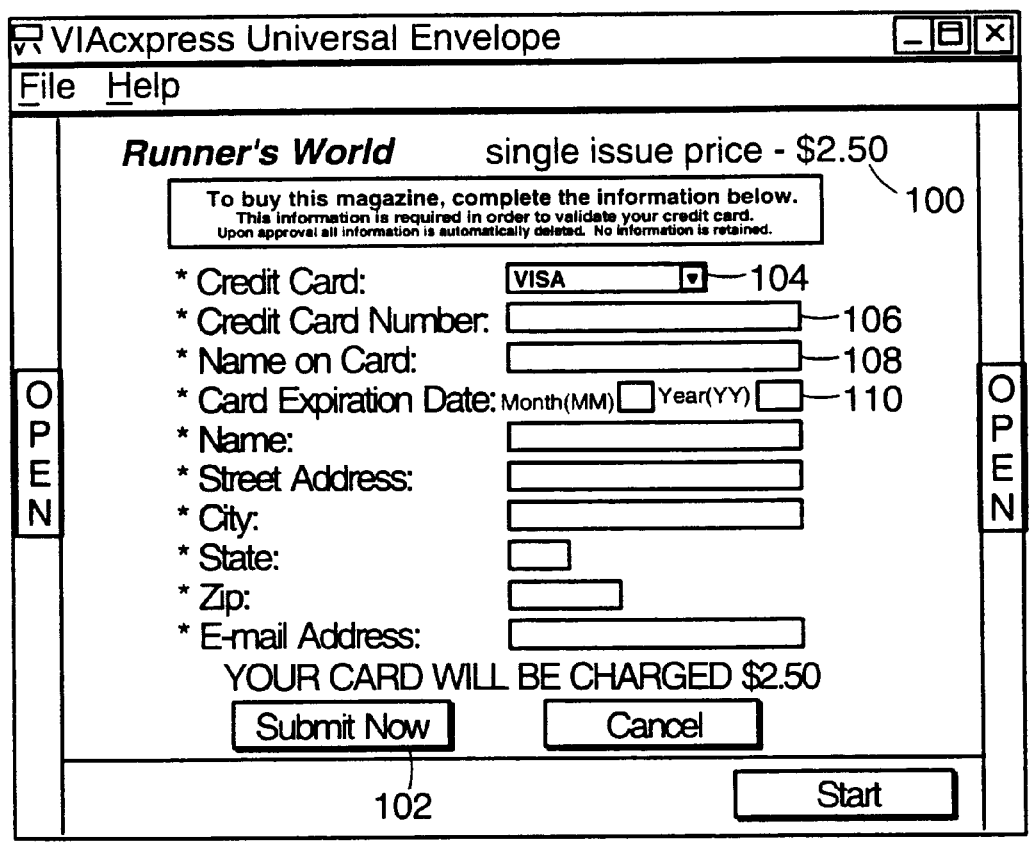
FIG. 8 is a solicitation form presented to the user when, for example, the check coded key function of FIG. 6 fails to confirm access to the object.
Figure 9:
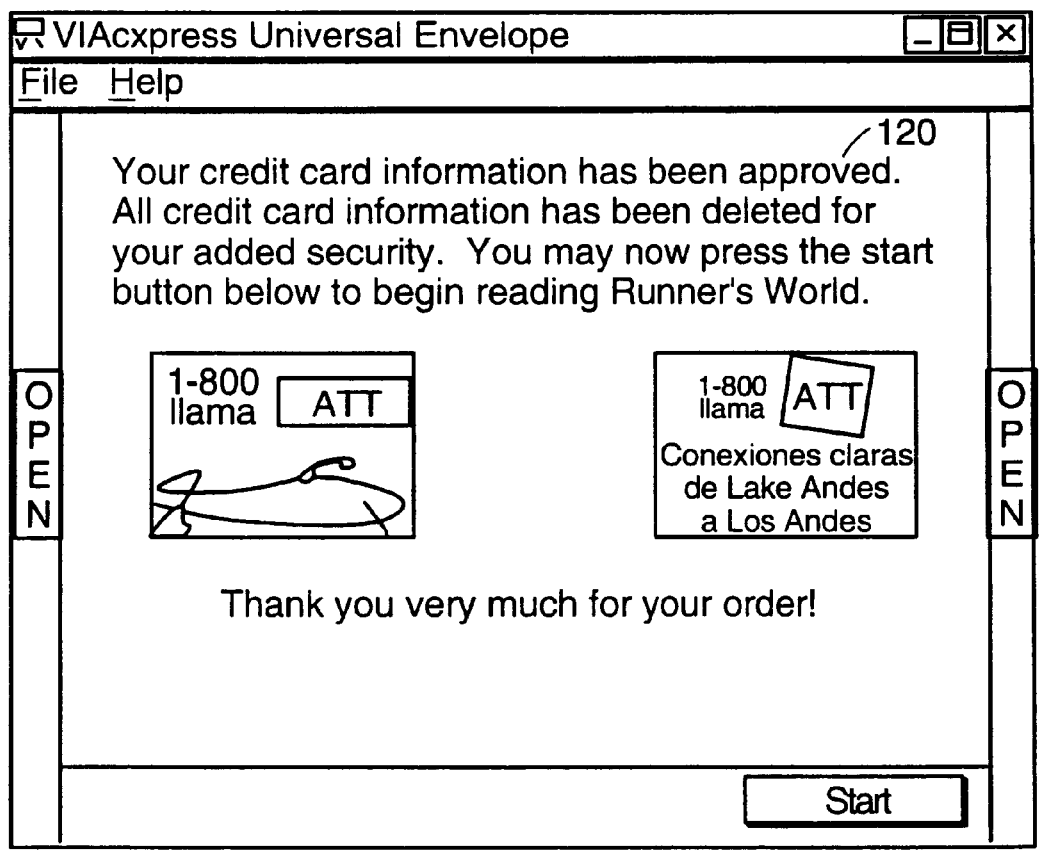
FIG. 9 is a "Ready For Use" message which may be presented to the user upon completion of the payment and installation process of FIG. 8.

FIGS. 7A and 7B are a flow chart illustrating the payment and installation process that may be performed when the coded key check process of FIG. 5 reveals that proper payment or other authorization has not yet been received in order to access the object at that particular computer. According to the process of FIGS. 7A and 7B, the client computer at step 70 first displays a solicitation form, an example of which is shown in FIG. 8. The solicitation form 100 is stored as part of the object, and allows the user to enter payment information or "use information" for the object. Payment information is the data used to validate and debit credit cards, or other means of electronic payment such as use of Electronic Funds Transfer (EFT) or electronic cash ("ecash") accounts. Use information is data used to control, for example, circulation materials such as industry and trade publications, which require the recipient to provide employment data in order to have a "no charge" edition of the publication. The mechanisms described herein can regulate access to digital content based on payment information, use information, or both. In the example of FIG. 8, the solicitation form has query boxes 104, 106, 108, and 110 for entry of credit card account information. The solicitation box corresponding to a different object could present different or additional spaces for entering other information.

Payment/use information is entered by the user at step 72 of FIG. 7A, and is held in solicitation form data files at the user's (client) computer. The user initiates submission of the data by activating the submit control, represented as the Submit Now button 102 in the interface of FIG. 8. Activating the submit control causes the client computer to set up a communications channel, for example, a socket connection. The socket initiates a TCP/IP connection over the public switched network (i.e. an Internet connection) between the client and a payment server computer. When the socket connection has been established, the payment/use data is transmitted at step 74 from the client to the payment server via the public switched network, through the socket connection.

At the payment server, the payment/use data is loaded into an "Open Data" file for preprocessing 76. Controlled use data information is validated or rejected at the payment server during preprocessing, based on previously established criteria relating to the particular object. Payment information is checked for a valid account format, for example, an existing credit card type and the correct number of digits, and valid expiration date. If the payment/use data is rejected during preprocessing, the data representing the invalid attempt is stored at step 78, and a rejection code is transmitted at step 80 to the client computer. The rejection code is a 128-bit string containing information indicating the reasons for the rejection. In this string, the first bit indicates rejection of the transaction, and the following bits contain specific information as to the deficiencies. The code is displayed as a rejection message 82 at the client computer, and the user has the opportunity to reenter the payment/use information 72. After three successive failures, the socket connection is terminated.

If the payment/use information is validated at the preprocessing stage, then it is copied from the "Open Data" file to a "Transmit and Authorize" file, and transmitted to an authorization center, such as a bank or credit card authorization center, at step 84 for account verification and authorization 86. A dedicated frame relay network can be used to connect the payment server to the authorization center, for communications therebetween. Alternatively, verifications and authorization can be performed using a public network. If the account information is authorized and the transaction approved by the authorization center, the appropriate account is billed or debited 88 and an authorization code is transmitted to the payment server at step 90, the authorization code indicating acceptance and authorization. If the transaction is rejected, due to insufficient funds in the account, for example, an authorization code is transmitted to the payment server at step 92, the authorization code indicating rejection of the transaction.

Upon receiving an authorization code from the authorization center, the payment server stores the payment/use information that had been submitted, along with the authorization code at step 94, in an "Accept and Reject" file. The payment server then processes the authorization code, to determine whether the transaction has been accepted or rejected 96. If rejected, the invalid attempt is stored 78 and a 128 bit rejection message is transmitted to the client at step 80, and displayed at the client at step 82, whereupon the user can again enter payment/use information 72 and resubmit the data 74. The rejection message may indicate, for example, invalid name, address, or insufficient account balance. If the check authorization code step 96 reveals acceptance of the transaction, the payment server initiates an install process at the client. At step 97, the payment computer transmits to the client an acceptance message or "token," which indicates that payment or approval for use has been authorized. In FIG. 7B, the acceptance message is a 128-bit message wherein the first bit signifies acceptance and the following 127 bits are "dummy" bits utilized for conveying information only when a rejection has occurred. The acceptance message can be made transparent to a user of the client computer. "Transparent," as used herein, means that the file (or "message," "token," "key," or "cookie") to the extent feasible is hidden or is not revealed to a user, so as to protect against interception, copying, reuse, or other manipulation by the computer seeking access to the content. If the transaction is rejected, the payment computer will transmit a rejection message. in FIG. 7B, the rejection message is a 128-bit message wherein the first bit signifies rejection to the client computer, and the following 127 bits contain information as to the reasons for the rejection.

An acceptance message causes the client to find the unique coded key associated with the object 90, and copy it to a system file, such as the Windows Registry, shown at step 98. The unique coded key is a numeric output of a mathematical algorithm, which is part of the parsed data string constituting the object 90, along with the solicitation form 100 and other necessary files. The unique coded key is encrypted in order to mask its identity and prevent unauthorized copying. In addition to storing the unique coded key in the Registry, the client also stores a machine identification code in the Registry at step 98, in order to lock the installation of the object to one particular machine. The object thereafter may be copied or transmitted to other client computers but will not be accessible at the other client computers until properly authorized and installed on those computers.

Upon storing the unique coded key and machine ID, the client decompresses, decodes, and executes, or "publishes," the object at step 99. Alternatively, a "Ready For Use" window 120, shown in FIG. 9, may first be displayed to the user upon installation, specifically notifying the user that the transaction has been approved and the object successfully installed. Up until this point, the transaction had been transparent to the user. When the object is executed, the files within the object are copied to a subdirectory of a temporary folder, and each time the object is closed, the files in the subdirectory are deleted. Once a particular object has been authorized and installed, the client may reopen and display or execute the object as many times as desired.

Additional security may be provided by the content producer or authorized distributor by utilizing an encryption algorithm to encrypt the files containing the content (in addition to encrypting the object itself) which are copied to the subdirectory upon decryption and execution of the object. The Blowfish algorithm may be used for encrypting the files containing the content. See B. Schneier, Fast Software Encryption 191–204 (Springer-Verlag, 1994), incorporated herein by reference. Thus, two levels of encryption can be utilized. For example, a digital newspaper may consist of multiple HTML files. The producer may encrypt the individual HTML files using Blowfish; the Blowfish-encrypted files may be packaged along with the application necessary for viewing the files (in the case of HTML files, a browser), a Dynamic Link Library (DLL) for use with the application, and the unique coded key, to comprise the object. The object, of course, is itself compressed and encrypted. When the object is accessed successfully and executed, the Blowfish-encrypted files are copied to the temporary subdirectory, the application and DLL packaged as part of the object is utilized for viewing or executing the files, with the files being encrypted "on-the-fly" as needed for viewing or using the object. This extra encryption step prevents, for example, locating and copying complete, decoded files containing the digital content during execution of the object.

Figure 10:
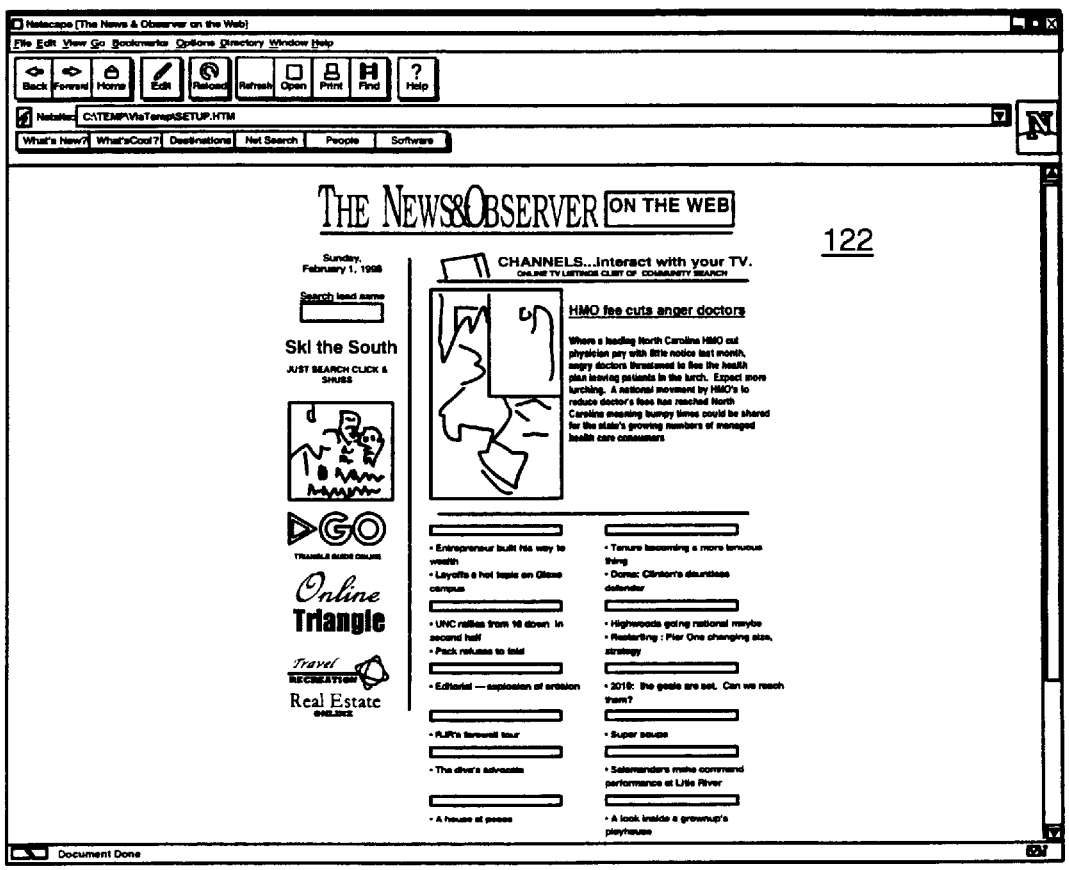
FIG. 10 is an example of an activated and published object: a digital newspaper made up of HTML files and displayed by a browser application.
Figure 11:
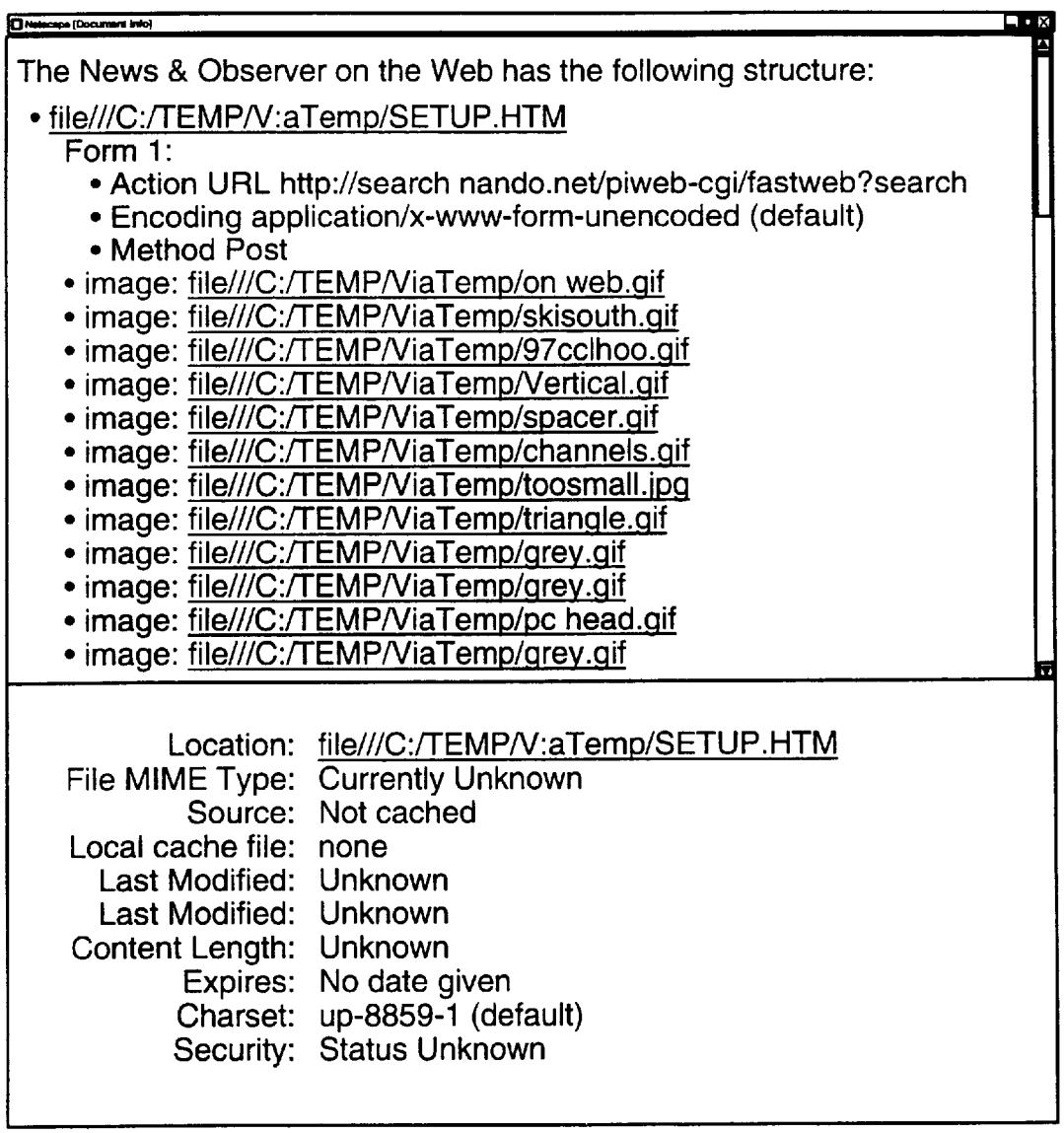
FIG. 11 is a file structure listing for the object of FIG. 10, illustrating client storage of the files constituting the object.
Figure 12:
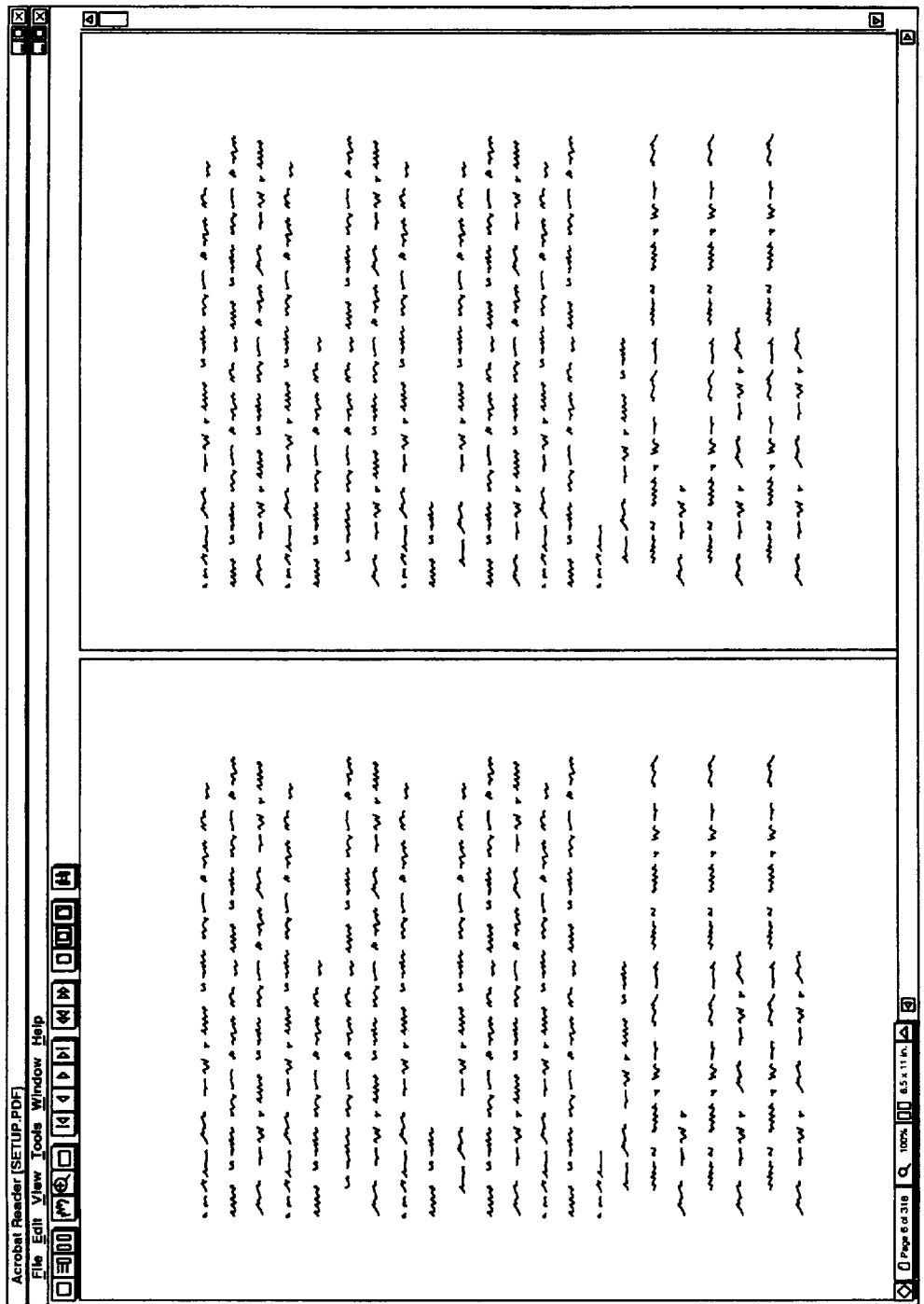
FIG. 12 is another example of an activated and published object: a digital novel stored as a PDF file and displayed by a viewer application.

FIG. 10 shows an example of an object that has been authorized and opened. The content 122 is a digital newspaper, consisting of HTML files, which has been published using a browser application at the client. As shown in FIG. 11, the files constituting the object are stored in a temporary subdirectory of the client computer's hard drive (e.g. the c:\ drive) and thus no network connection is necessary to browse the contents. Objects can assume a variety of different file formats; if the client has a proper application for opening the particular file format, the object will be published and displayed at the client. FIG. 12, for example, shows an object in the PDF file format, a novel, published at the client using a viewer application. Other formats can be authorized, installed, and published, such as AVI and MPEG (movies), WAV (sound), or JPEG (graphics).

The techniques and mechanisms described here were implemented on the Microsoft Windows Operating System using the C++ programming language. They are not limited to any particular hardware or software configuration, but rather they may find applicability in any computing environment in which electronic products may be ordered, delivered, and paid for electronically. These techniques and mechanisms may be implemented in hardware or software, or a combination of the two. Preferably, implementation is achieved with computer programs executing on programmable computers that each include a processor, a storage medium readable by the processor, including volatile and non-volatile memory and/or storage elements, and suitable input and output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system also may be implemented as a computer-readable storage medium, configured with a computer program, where the storage medium so configured causes a computer to operate in a specific and predefined manner.

What is claimed is:

1. A computer-implemented method of regulating access to digital content, the method comprising:
   at a client, executing an access checking process to determine whether the client holds a pre-existing permission for a resource to access the digital content,
   if not, requesting permission from an external source for the resource to access the digital content;
   receiving from the external source a token; and
   based on the received token, executing an installation process that generates at the client a permission that is locked uniquely to the client and that may be found by a later execution of the access checking process.

2. The method of claim 1, wherein requesting the permission, receiving the token, and selectively granting the resource access are performed on the client.

3. The method of claim 2, wherein the token is not transferable to another client.

4. The method of claim 1, wherein the permission comprises a unique coded key corresponding to the digital content.

5. The method of claim 4, wherein the installation process includes installing at the client a machine identification code identifying the client on which the installation process is executed.

6. The method of claim 4, wherein the access checking process determines whether the client holds a permission and a machine identification code.

7. The method of claim 1, wherein the token is inaccessible to the resource.

8. The method of claim 1, wherein the external source comprises a server.

9. The method of claim 8, wherein the permission is requested via a public switched network and the token is received via the public switched network.

10. The method of claim 9, the method further comprising establishing a socket connection with the server computer for requesting the permission and receiving the token via the public switched network.

11. The method of claim 1, wherein the resource comprises a human initiating a computer operation.

12. The method of claim 1, wherein the resource comprises a computer program.

13. The method of claim 1, wherein requesting the permission from the external source initiates an authorization procedure, and the token received is based on a result of the authorization procedure.

14. The method of claim 13, wherein the authorization procedure is executed in real-time.

15. The method of claim 13, wherein the token comprises a data string containing a code indicating whether permission is granted.

16. The method of claim 13, wherein requesting the permission from the external source includes transmitting payment information to the external source.

17. The method of claim 16, wherein the payment information includes a credit card number.

18. The method of claim 16, wherein the authorization procedure comprises:
  transmitting payment data based on the payment information to a payment authorization center;
  processing the payment data at the payment authorization center; and
  transmitting an authorization code from the payment authorization center to the external source based on the processing of the payment information.

19. The method of claim 18, wherein the payment data and the authorization code are transmitted via a dedicated frame relay network.

20. The method of claim 13, wherein the authorization procedure comprises:
  processing use information received from a client;
  searching the use information for a predefined parameter; and
  transmitting the token to the client based on a result of the search.

21. A computer-implemented method for selectively granting access to an encrypted object, the method comprising:
  in response to a request from a client to a server for permission for access to the encrypted object, returning to the client a token that is not unique to the encrypted object or to the client,
  in response to the token, generating a permission key at the client, and
  decrypting the object at the client.

22. The method of claim 21, wherein the encrypted object includes digital content, a copy of the key corresponding to the object, and an authorization form for collecting authorization information.

23. The method of claim 21, wherein the object includes a file comprising digital content, and decrypting the object initiates copying of the file comprising the digital content to a temporary location at the client.

24. The method of claim 23, the method further comprising reencrypting the object and removing the file comprising the digital content from the temporary location at the client based on a request to close the object.

25. The method of claim 24, wherein the object is stored in encrypted format at the client until another request to access the object occurs.

26. The method of claim 21, wherein the objects is transferable to another client and the permission key corresponding to the object is not transferable to another client.

27. The method of claim 21, wherein the object includes a file comprising digital content, decrypting the object allows use of the digital content, and the file comprising the digital content is protected from copying while the digital content is being used.

28. The method of claim 27, wherein the file comprising digital content is encrypted, decrypting the object causes the encrypted file comprising digital content to be copied to a temporary location at the client, and use of the digital content is enabled by decrypting the file comprising digital content as a continuous data stream in real-time.

29. The method of claim 28, wherein the file comprising digital content is encrypted using at least one algorithm selected from the group consisting of Blowfish, RSA, DES, Triple DES, Twofish, Cast-128, Cast-256, Gost, IDEA, Mars, Mistyl, RC2, RC5, RC6 and Rijndae.

30. The method of claim 21, the method further comprising:
  requesting the object from a merchant server via a public switched network;
  receiving the object from the merchant server via the public switched network; and
  storing the object at the client.

31. The method of claim 30, wherein the object is received as an electronic mail attachment.

32. A computer-implemented method of regulating access to protected digital content at a client, the method comprising:
  including the protected digital content in a package that comprises an executable process,
  providing the package to the client,
  in connection with a request at the client for access to the protected digital content, executing the executable process at the client to request permission from a server for access to the protected digital content,
  receiving from the server a token;
  based on the token received, selectively
  granting access at the client to the digital content.

33. The method of claim 32, wherein the digital content is contained in a file that is part of a locked, compressed object.

34. The method of claim 33, wherein the digital content is reusable at the client and the locked, compressed object is transferable to another client.

35. The method of claim 33, wherein granting access to the digital content comprises decoding and decompressing the object, creating a temporary copy of the file containing the digital content at a location at the client, and upon notification that the resource is finished accessing the digital content deleting the temporary copy of the file containing the digital content, and encrypting and compressing the object.

36. The method of claim 32, wherein the token is inaccessible to the resource.

37. A system for selectively granting access to digital content, the system comprising:
  a client for executing an access checking process to determine whether a client holds a pre-existing permission for a resource to access the digital content; for transmitting access information if the access checking process fails to determine that the client holds the permission; for receiving a token; and for executing an installation procedure based on the received token to install a permission that is unique to the client and may be found by a later execution of the access checking process;

a server for receiving access information transmitted by the client; for processing the access information; for submitting authorization information based on the access information; for receiving an authorization code; and for transmitting the token to the client based on the authorization code received; and an authorization process for receiving the authorization information submitted by the server; for confirming the authorization information; and for providing the authorization code to the server.

38. The system of claim 37, wherein the access information comprises use information.

39. The system of claim 37, wherein the access information comprises payment information.

40. The system of claim 39, wherein the payment information includes a credit card number.

41. The system of claim 37, the system further comprising a public switched network for transmitting the access information and the token.

42. The system of claim 41, wherein a secure socket connection is established between the client and the server for transmitting the access information and the token via the public switched network.

43. The system of claim 42, wherein the secure socket connection is opened before transmitting the access information and the secure socket connection is closed after receiving the token.

44. The system of claim 37, the system further comprising a frame relay network for transmitting the authorization information and the authorization code.

45. The system of claim 37, wherein the resource comprises a computer process.

46. The system of claim 37, wherein the digital content has an associated key, and the installation procedure comprises writing the associated key to a location at the client.

47. The system of claim 46, wherein the installation procedure further comprises writing machine identification data to a location at the client, the machine identification data enabling access to the digital content at the client.

48. The system of claim 47, wherein the associated key and the machine identification data are written to the registry file on a Windows operating system.

49. The system of claim 46, wherein the access check comprises checking the client for the associated key and the machine identification data.

50. The system of claim 37, the system further comprising a merchant server for receiving requests electronically for delivery of the object; and for delivering the object electronically.

51. The system of claim 50, wherein the object is requested and the object is delivered via a public switched network.

52. The system of claim 50, wherein the object is requested via the Internet and the object is delivered in compressed format via the Internet.

53. The system of claim 50, wherein the object is delivered in compressed format using electronic mail.

54. The system of claim 37, wherein the object is obtained from a read-only removable storage medium.

55. The method of claim 9, the method further comprising establishing a secure socket connection with the server for requesting the permission and receiving the token via the public switched network.

56. The method of claim 55, the method further comprising opening the secure socket connection before transmitting the access information and closing the secure socket connection after receiving the token.

* * * * *